United States Patent [19]

Yamaguchi et al.

[11] Patent Number: 5,250,088
[45] Date of Patent: Oct. 5, 1993

[54] GAS SEPARATION PROCESS

[75] Inventors: Toshio Yamaguchi; Yasushi Kobayashi, both of Chiba, Japan

[73] Assignee: Toyo Engineering Corporation, Tokyo, Japan

[21] Appl. No.: 878,569

[22] Filed: May 5, 1992

[30] Foreign Application Priority Data

May 13, 1991 [JP] Japan .................. 3-135359

[51] Int. Cl.$^5$ .............................. B01D 53/04
[52] U.S. Cl. ....................... 95/98; 95/139; 95/140; 95/143
[58] Field of Search .............. 55/25, 26, 58, 62, 68, 55/74, 75, 161-163, 179, 180, 387, 389

[56] References Cited

U.S. PATENT DOCUMENTS

| | | | |
|---|---|---|---|
| 3,788,036 | 1/1974 | Lee et al. | 55/62 X |
| 4,015,956 | 4/1977 | Münzner et al. | 55/62 X |
| 4,194,890 | 3/1980 | McCombs et al. | 55/179 X |
| 4,263,018 | 4/1981 | McCombs et al. | 55/179 X |
| 4,305,734 | 12/1981 | McGill | 55/58 X |
| 4,350,500 | 9/1982 | Esselink | 55/62 X |
| 4,402,712 | 9/1983 | Benkmann | 55/62 X |
| 4,421,530 | 12/1983 | Dalton, Jr. et al. | 55/62 X |
| 4,512,778 | 4/1985 | Simonet et al. | 55/62 X |
| 4,512,779 | 4/1985 | Hay | 55/62 X |
| 4,512,780 | 4/1985 | Fuderer | 55/62 X |
| 4,636,226 | 1/1987 | Canfora | 55/179 X |
| 4,783,203 | 11/1988 | Doshi | 55/179 X |
| 4,816,039 | 3/1989 | Krishnamurthy et al. | 55/62 X |
| 4,861,351 | 8/1989 | Nicholas et al. | 55/62 X |
| 4,981,499 | 1/1991 | Hay et al. | 55/62 X |
| 5,122,164 | 6/1992 | Hirooka et al. | 55/62 X |

FOREIGN PATENT DOCUMENTS

| | | |
|---|---|---|
| 0022603 | 1/1981 | European Pat. Off. |
| 0307843 | 3/1989 | European Pat. Off. |
| 0312743 | 4/1989 | European Pat. Off. |
| 0426937 | 5/1991 | European Pat. Off. |
| 62-47051 | 10/1987 | Japan. |

OTHER PUBLICATIONS

Derwent Abstract of Japanese Patent No. 62-47051.

Primary Examiner—Robert Spitzer
Attorney, Agent, or Firm—Flynn, Thiel, Boutell & Tanis

[57] ABSTRACT

A process for obtaining highly-purified gas by selectively separating at least one gaseous impurity from a gaseous mixture by the known pressure swing adsorption method uses a holding column of the feed-in/feed-out sequence retaining type and at least three adsorption columns containing adsorbents. Each adsorption column is pressurized and depressurized in cycle to repeat adsorption and desorption steps. During this, the holding column is used as an intermediate gas reservoir to improve the efficiency of the separation. In this invention, the capacity of the holding column is insufficient to hold the whole amount of purge gas.

4 Claims, 4 Drawing Sheets

GAS SEPARATION PROCESS

BACKGROUND OF THE INVENTION

1. Field of the Invention

This invention relates to a process for selectively separating gaseous components from a gaseous mixture by using an adsorbent.

2. Description of the Prior Art

As processes for the selective separation of gaseous components, especially gaseous impurities from a gaseous mixture, it has heretofore been the common practice to have the gaseous impurity adsorbed on an adsorbent in an adsorbent layer and, when the adsorbent has reached the limit of its adsorbing ability, to depressurize the adsorbent layer, followed by purging of the adsorbent layer with a gas which does not contain the gaseous impurity so much, so that the gaseous impurity is desorbed from the adsorbent to regenerate the adsorbent.

Among these processes, Japanese Patent Publication No. 47051/1987 (hereinafter abbreviated '051) discloses the following process as a gas separation process capable of minimizing the loss of the treated, i.e., purified gas.

According to this conventional process, the gaseous impurity is selectively and adiabatically adsorbed on an adsorbent. The adsorbent is depressurized and is then purged at a low pressure using a gas which may range from a gas contaminated only a little to a substantially pure gas, thereby conducting desorption of the gaseous impurity and regeneration of the adsorbent. The adsorbent is pressurized again. The conventional process features alternate and cyclic use of many columns with adsorbents so that the gaseous impurity is separated from a gaseous mixture to provide a purified gas. Each cycle comprises a number of steps starting with a first adsorption column whose adsorbent has fatigued as a result of adsorption of the gaseous impurity. These steps comprise:

depressurizing the first adsorption column through an outlet thereof while an inlet of the first adsorption column is closed, so that gas present in the voids of the first adsorption column is allowed to expand;

introducing the thus-expanded gas to another adsorption column, which has been regenerated, through an outlet of said another adsorption column until said another adsorption column and the first adsorption column are equalized in pressure;

depressurizing the first adsorption column further through the outlet thereof to cause the gas, which is present in the voids of the first adsorption column, to expand further and, then, introducing the further-expanded gas into a packed column with an inert, non-porous packing having a high void fraction from one end thereof;

introducing another further-expanded gas from a second adsorption column, whose adsorbent has fatigued, to the packed column through the opposite end of the packed column, whereby eliminating the first-mentioned further-expanded gas from the packed column;

depressurizing the first adsorption column to a low pressure through the inlet thereof, introducing a portion or all of the first-mentioned further-expanded gas, which has been eliminated from the packed column, into the first adsorption column to purge the first adsorption column, and if there is still any remaining portion of the first-mentioned further-expanded gas eliminated from the packed column, introducing the remaining portion of the first-mentioned further-expanded gas into a third adsorption column, which has been regenerated, through an inlet thereof to pressurize the third adsorption column to an intermediate level;

introducing expanded gas from a fourth adsorption column, which has fatigued, into the first adsorption column, which has already been regenerated, through the outlet while closing the inlet of the first adsorption column until the fourth adsorption column and the first adsorption column are equalized in pressure;

introducing a gas of the same quality as the purified gas from a gas stream of the same quality as the purified gas into the first adsorption column through the outlet thereof while closing the inlet of the first adsorption column until the pressure inside the first adsorption column becomes equal to the pressure of the gas stream; and introducing the gaseous mixture, which contains the gaseous impurity, into the first adsorption column through the inlet thereof and discharging the purified gas through the outlet of the first adsorption column.

According to the above conventional process, the use of the column packed with the inert, non-porous packing having the high void fraction as the holding column of the feed-in/feed-out sequence retaining type has made it possible to reverse the concentration gradient opposite to that at the time of the flowing-in, thereby having the merit that the loss of the purified gas can be reduced.

The '051, however, does not contain any specific disclosure about the size of the packed column. In claim 2 of this citation, there is a disclosure that "the expanded gas introduced from the first adsorption column through one inlet of the packed column, which can be approached in two directions, substitutes for and forces out the gas introduced from another adsorption column through the another inlet of the packed column in the preceding step, and the gas so substituted and forced out is entered another adsorption column to effect purging and/or repressurization." As is understood from the disclosure, the packed column satisfactorily performs the above function in the conventional process so that its capacity is considered to be large enough to hold the whole amount of the purge gas sufficiently.

It is, however, not advantageous from the economical standpoint to provide a packed column having a capacity sufficient to hold the whole amount of purge gas in view of safety. Further, from the technical standpoint, it is not clear if the capacity sufficient to hold the whole amount of purge gas is needed.

SUMMARY OF THE INVENTION

The present inventors have proceeded with an extensive investigation to determine, from the economical and technical standpoints, what capacity of a packed column, i.e., a holding column (hereinafter in the present invention the term "holding column" is used), would be sufficient to achieve gas separation with a minimized loss of purified gas upon practice of the above conventional process, resulting in the completion of the present invention.

This invention, therefore, provides a process for separating gaseous impurities from a gaseous mixture by using a multiplicity of adsorption columns (A, B, C and D) containing adsorbents and a holding column (R) of the feed-in/feed-out sequence retaining type having a capacity not sufficient to hold purge gas in its entirety, thereby to obtain a purified gas, said process including repeating alternate, cyclic adsorption and desorption as to at least three of the adsorption columns, which comprises the following steps a) to i):

a) feeding the gaseous mixture into a first adsorption column through an inlet thereof, discharging the purified gas through an outlet of the first adsorption column, and terminating the feeding and discharging before the first adsorption column has no remaining adsorbing ability and the purity of the purified gas falls below a target level;

b) communicating an outlet of at least one other adsorption column, whose adsorbent has been regenerated, with the outlet of the first adsorption column already subjected to the step a, whereby both the adsorption columns are equalized in pressure, and then eliminating the communication;

c) communicating the outlet of the first adsorption column, which has been subjected to step b, with a first end of the holding column which contains a gas received as a result of communication of a second end of the holding column with at least one outlet of the other adsorption columns having been subjected to steps a and b like the first adsorption column, whereby the gas inside the first adsorption column is allowed to enter the holding column; during the entrance of the gas from the first adsorption column into the holding column, maintaining the second end of the holding column in communication with an outlet of a second adsorption column already subjected to steps a, b and c and also to the below-described step d, whereby the second adsorption column is purged with the gas forced out of the holding column by the gas flowed into the holding column, the last-mentioned gas as needed; and, until the breakthrough of the components adsorbed on the adsorbent bed of the first adsorption column begins to occur in the gas, the gas in the first adsorption column being allowed to enter the second adsorption column through the outlet thereof by the holding column or without allowing a portion of the gas of the first adsorption column to flow by the holding column, thereby purging the second adsorption column;

d) closing a purge valve of the second adsorption column as needed, whereby the second adsorption column and the first adsorption column are communicated to each other and equalized in pressure, and then eliminating the communication;

e) closing the outlet of the first adsorption column already subjected to step c or d and depressurizing the first adsorption column to a low pressure by a purge valve provided on the side of the inlet of the first adsorption column, whereby the components adsorbed on the adsorbent bed of the first adsorption column is desorbed and eliminated;

f) communicating an outlet of a third adsorption column, which has been subjected to steps a and b like the first adsorption column, with the first end of the holding column, whereby the gas inside the third adsorption column is allowed to enter the holding column until the breakthrough of the components adsorbed on the adsorbent bed of the third adsorption column begins to occur in the gas, said gas entering the holding column optionally containing a portion of the purified gas as needed; during the entrance of the gas from the first adsorption column into the holding column, maintaining the second end of the holding column in communication with the outlet of the first adsorption column already subjected to step e, whereby the first adsorption column is purged with the gas forced out of the holding column by the gas flowed into the holding column, the last-mentioned gas optionally containing a portion of the purified gas as needed; and, until the breakthrough of the components adsorbed on the adsorbent bed of the third adsorption column begins to occur in the gas, the gas in the third adsorption column being allowed to enter the first adsorption column by the holding column or without allowing a portion of the third adsorption column gas to flow by the holding column, thereby purging the first adsorption column;

g) closing the purge valve of the first adsorption column as needed, whereby the first adsorption column and the third adsorption column are communicated to communicate with each other and equalize in pressure, and then eliminating the communication;

h) communicating the outlet of at least one other adsorption column, which has been subjected to step a or steps a and b like the first adsorption column, to the outlet of the first adsorption column, which has been subjected to step f or g, while closing both an inlet of said at least one other adsorption column and the inlet of the first adsorption column, whereby the gas inside said at least one other adsorption column is allowed to enter the first adsorption column, said last-mentioned gas optionally containing a portion of the purified gas as needed, to subject both said at least one other adsorption column and the first adsorption column to at least one pressure equalizing operation, and then eliminating the communication; and i) causing a gas of the same quality as the purified gas to flow into the first adsorption column, which has been subjected to step h, through the outlet thereof while closing the inlet thereof, whereby the pressure of the first adsorption column is equalized with that of the gas of the same quality as the purified gas, and then closing the outlet of the first adsorption column.

According to the present invention, despite the use of the holding column of a capacity not sufficient to hold the whole amount of purge gas, one or more impurities can be selectively separated from a gaseous mixture to obtain highly-purified gas in high yield. This invention, therefore, has made it possible to reduce the size of the holding column, thereby causing a significant economical merit.

DETAILED DESCRIPTION OF THE PREFERRED EMBODIMENTS

Despite the decrease of the capacity of the holding column to being insufficient to hold the whole amount of the purge gas, the present invention can still achieve separation of gases with a reduced loss of purified gas. When the gaseous mixture to be treated is, for example, refinery plant off-gas composed of hydrogen and methane gas, the purity of hydrogen gas so purified is by no means inferior to that of hydrogen gas purified by using a holding column whose capacity is large enough to hold the whole amount of purge gas and, when the step d) is incorporated, hydrogen gas can be recovered at still higher efficiency (higher recovery rate of hydrogen gas). The present invention, therefore, makes it possible to reduce the size of the holding column, thereby causing a significant economical merit.

Figure 1:
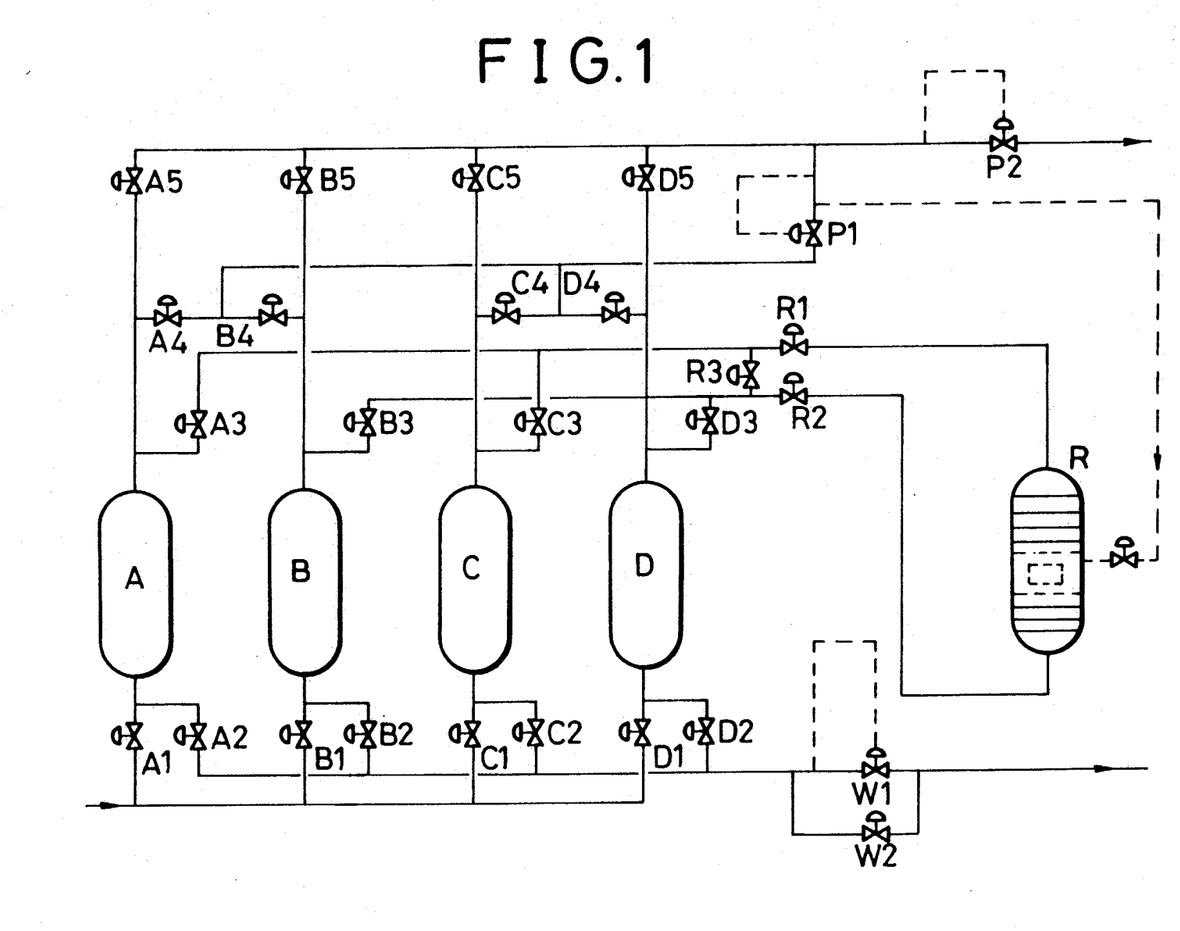
FIG. 1 is a flow sheet of a system for enforcing the process of this invention.

As the capacity of the holding column is reduced and the recovery rate of purified hydrogen gas is increased, it becomes no longer possible to store a portion of the purge gas, said portion containing the gaseous impurity at high concentrations, in its entirety in the holding column. To cope with this, as is illustrated in FIG. 1, the holding column can be provided with a bypass line so that first and last portions of purge gas recovered from each adsorption column as a result of its depressurization can be fed by way of the holding column and the intermediate portion of the purge gas is allowed to bypass the holding column. This makes it possible to retain the reversed state of the concentration gradient of the purge gas obtained as a result of depressurization. The bypass line is provided with a bypass valve to control the flow rate or the depressurization rate. Although the bypass line is provided before valves R1, R2 in FIG. 1, it can be arranged on the side of the holding column relative to the valves R1, R2. This, however, requires a more complex directional control valve, such as a three-way valve, so that the holding column and the bypass line can be completely cut off to maintain the pressure of the holding column.

Figure 2:
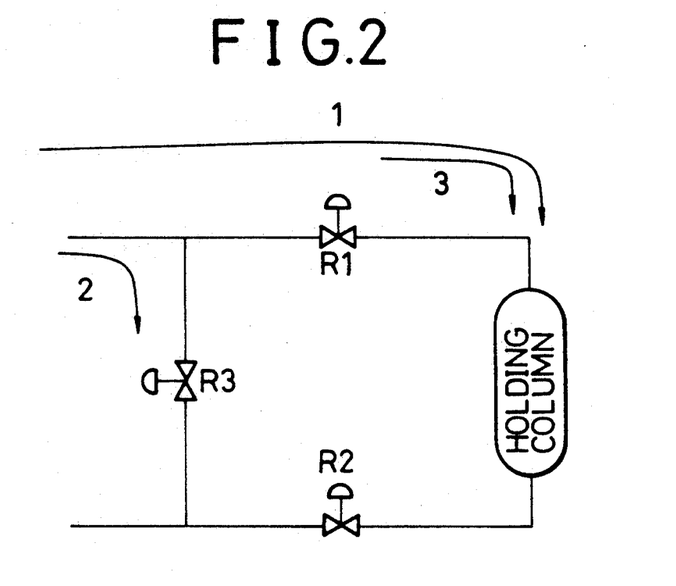
FIG. 2 schematically shows the arrangement of the inlet/outlet valves R1, R2 for the holding column R and the bypass valve R3, in which signs 1-3 indicate the flows of purge gas.
Figure 3:
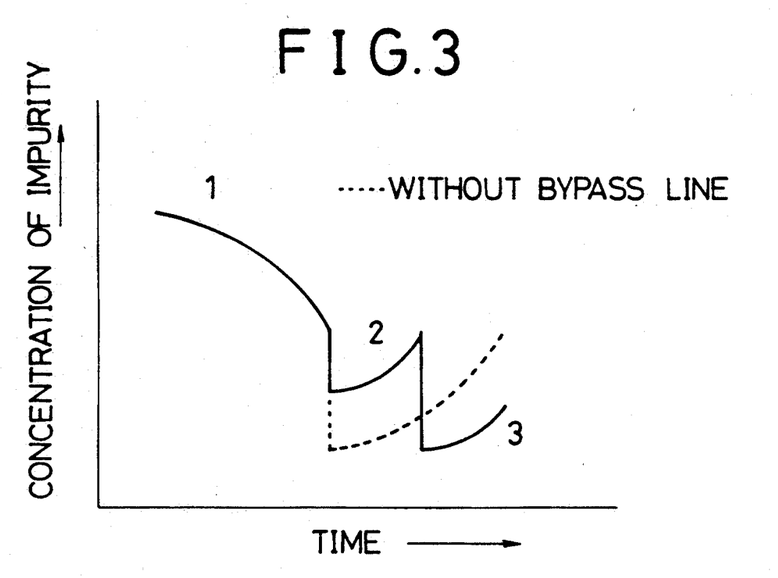
FIG. 3 diagrammatically shows a relationship of the concentration of the gaseous impurity and time corresponding to the flows of purge gas in FIG. 2.

FIG. 2 schematically illustrates the arrangement of the inlet and outlet valves R1, R2 for the holding column R and a bypass valve R3. Signs 1, 2 and 3 indicate flows of purge gas. FIG. 3 diagrammatically shows a relationship of the concentration of the gaseous impurity and time corresponding to the flows of purge gas in FIG. 2. As indicated by 1, the purge gas first flows through the holding column by way of the valve R1 (R2 when the flowing direction of the purge gas is opposite). During this time, the concentrations of the gaseous impurity in the purge gas gradually drop. At the time point where the concentration gradient for the gaseous impurity begins to be reversed, the purge gas is bypassed from the holding column (2) and, at the end of the reverse, the purge gas is again allowed to flow through the holding column (3). This can provide a higher purging effect compared to that available without bypassing the purge gas (the curve indicated by the dotted line in FIG. 3).

The achievement of a high recovery rate of purified gas despite the use of the holding column whose capacity is too small to hold the entire amount of purge gas sufficiently can be attributed to the following reasons. First, it is unnecessary to use, as purge gas, gas with reversed concentration gradient of the gaseous impurity for a high-purity portion of purified gas. As purge gas for such a high-purity portion, it is sufficient to introduce gas, which has not been held in the holding column, either directly from one or more of the adsorption columns or by way of the holding column. Accompanying the purge gas for such a high-purity portion, the holding column desirably has a capacity such that the highest concentration of the gaseous impurity in the purge gas does not exceed the average concentration of the gaseous impurity in the purge gas held in and forced out from the holding column. Further, the size reduction of the holding column has made it possible to reduce the extent of mixing of gases, said mixing taking place unavoidably in the holding column, thereby facilitating the maintenance of the composition of the gaseous impurity in the holding column.

In the present invention, the capacity of the holding column may be sufficient to hold 80% or less of the whole amount of purge gas. In some instances, the advantages of the present invention can still be attained even with a holding column whose capacity is so small that only 10% of the whole amount of purge gas can be held.

The present invention can be applied to various cases in each of which one or more impurities are selectively separated from a gaseous mixture to obtain a product gas having a high purity. The present invention is particularly suitable for obtaining a gaseous product with a relatively high impurity concentration (several hundreds ppm or higher) from refinery off-gas, ethylene plant off-gas or steam reforming gas.

The holding column of the feed-in/feed-out sequence retaining type, which is employed in the present invention, can receive, hold and feed out a gaseous mixture having a gas concentration attribution in the direction of the length of the feed line while retaining the attribution. Describing its function in short, when the gas is caused to flow from the first adsorption column into the holding column in step c), the particular component adsorbed on the adsorbent bed in the first adsorption column (hereinafter called "the first adsorbent bed") is desorbed (The particular component is hereinafter to be referred to as "the impurity" without wishing to be limited thereto.). Accordingly, the concentration of the impurity in the gas flowing out of the first adsorption column is relatively low in an initial stage but becomes relatively high in a later stage. The gas flowing into the holding column, therefore, has a concentration gradient with respect to the impurity. In other words, the gas flowed in earlier has a lower impurity concentration. In step f), the gas having the above-described concentration gradient is caused to flow in the direction opposite to the direction of the same gas flowed into the holding column so that the first adsorption column is purged. The impurity on the first adsorption bed is eliminated further by this purging. The gas flowing into the first adsorption column has a concentration gradient such that the concentration of the impurity is high at the beginning but gradually becomes lower. Therefore, the first adsorbent bed is effected to purge with the relatively contaminated gas while the contamination of the first adsorbent bed is substantial but with the less contaminated, i.e., cleaner gas as the first adsorbent bed becomes cleaner. It is to be noted that economical and efficient purging is feasible.

The holding column may be at least one column packed with an inert non-porous packing having a high void fraction, such as disclosed in the '051, which may be divided by one or more partition walls to define a row of spaces arranged in series, may be in the form of a hollow body or may be divided into small compartments arranged in series; at least one row of a column not packed with any packing; or a combination thereof, that is, a holding column partly packed with a packing. The object and advantages of the present invention can be attained whichever holding column is used.

In the present invention, further, the concentration of an impurity in a gaseous product can be controlled by monitoring the concentration gradient of the impurity in purge gas to determine the composition of the purified gas and, if necessary, modifying the cycle time to control the concentration gradient of purge gas in advance. Such modifications of the cycle time can be effected either manually or by automatic control.

The gas to be treated according to the process of the present invention is a mixture composed of hydrogen gas and at least one gaseous impurity to be eliminated. Examples of the gaseous impurity include methane, gaseous hydrocarbons other than methane, carbon dioxide and carbon monoxide.

Examples of the present invention will hereinafter be described with reference to the accompanying drawings.

EXAMPLE 1

Using the gas separation system of the flow sheet shown in FIG. 1, separation of gases was conducted according to the operation shown in FIG. 2.

FIG. 1 is a flow sheet of the process of the present invention as practiced using four adsorption columns and one holding column. Principal elements shown in the drawing are as follows:
A-D: adsorption columns,
R: holding column,
A1, B1, C1 and D1: inlet valves for gas to be treated,
A2, B2, C2 and D2: off-gas purge valves,
A3, B3, C3 and D3: communication valves to holding column,
A4, B4, C4 and D4: pressurizing or depressurizing valves,
A5, B5, C5 and D5: outlet valves for purified gases,
R1 and R2: inlet and outlet valves of the holding column,
R3: bypass valve, and
P1: valve for purified gas to be used for pressurization.
P2: product gas pressure control valve
W1: dump gas flow control valve
W2: purge gas valve.

Figure 4:
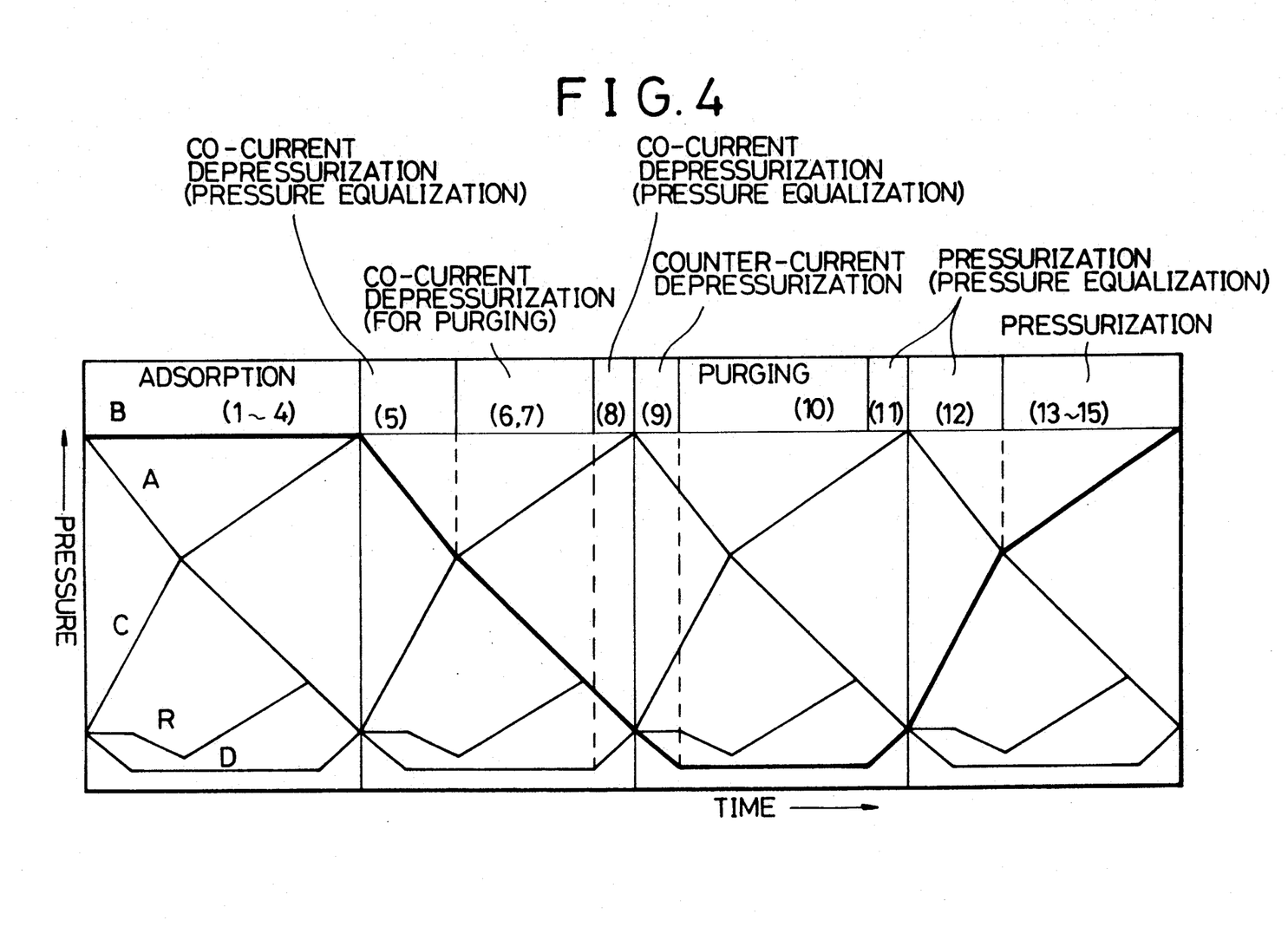
FIG. 4 is one example of a time-pressure diagram during a single cycle when a system includes 4 adsorption columns.

FIG. 4 is a time-pressure diagram suitable for use in describing the process of the present invention.

The operation of FIG. 1 is now described step by step, highlighting the adsorption column B as the first adsorption column.

Sub-steps 1-4 (step a):

A gas to be treated is introduced under a high pressure into the first adsorption column B through the inlet valve B1 and, after adsorption of an impurity, the purified gas is discharged through the outlet valve B5. Before the adsorption column B no longer has any remaining adsorbing ability and the purity of the purified gas falls below a target level, the valves B1 and B5 are closed to finish the adsorption.

Sub-step 5 (step b):

The adsorption column B is depressurized through the valve B4. Gas flowing out of the adsorption column B is used to raise the pressure of another adsorption column D.

Sub-step 6:

The adsorption column B is depressurized further through the valve B3. Gas flowing out of the adsorption column B is fed to the holding column through the valve R2. This procedure is continued until the breakthrough of the impurity begins to take place in the gas flowing out of the adsorption column B.

Sub-step 7 (sub-steps 6 and 7 corresponding in combination to step c):

The gas stored in the holding column R is forced out by the gas, which has flowed out of the first adsorption column B and has entered the holding column R, and is then introduced into the second adsorption column A through the valves R1 and A3, whereby the impurity is purged from the second adsorption column A.

Sub-step 8 (step d):

A purge valve A2 of the second adsorption column A is closed, whereby the adsorption column B is equalized again in pressure with the adsorption column A by extra purge gas from the adsorption column B.

Sub-step 9 (step e):

The valve B3 is closed and the valve B2 is opened instead, whereby the internal pressure of the adsorption column B is lowered to a lowest level to desorb the impurity.

Sub-step 10 (step f):

The gas stored in the holding column R is forced out by gas, which has flowed out of the third adsorption column C and has entered the holding column R, and is then introduced into the first adsorption column B through the valves R2 and B3, whereby the impurity is purged from the first adsorption column B.

Sub-step 11 (step g):

The purge valve B2 of the adsorption column B is closed, whereby the adsorption column C is equalized again in pressure with the adsorption column B by extra purge gas from the adsorption column C.

Sub-step 12 (step h):

Gas, which has flowed out of the fourth adsorption column D to depressurize the column D, and a portion of purified gas are introduced into the first adsorption column B through the valve B4, so that the internal pressure of the first adsorption column B is raised.

Sub-steps 13-15 (step i):

A portion of the purified gas is introduced into the first adsorption column B through the valves P1 and B4, whereby the first adsorption column B is pressurized to an adsorbing pressure.

The composition (percentage by dry volume basis) of a gaseous mixture treated was as follows:
$H_2$:78.9, $CH_4$:15.2, $C_2H_6$:4.1, $C_3H_8$:1.3, n-$C_4H_{10}$:0.3, n- and i-$C_5H_{12}$:0.1, $H_2O$:0.1

The gaseous mixture was introduced at the pressure of 29 kg/cm² (absolute) and the flow rate of 2350 Nm³/hr at 15° C. into the separation system of FIG. 1. As a result of the separation, purified gas consisting of hydrogen of at least 99.96 vol. % purity was obtained at the flow rate of 1595 Nm³/hr. That is, about 86% of the hydrogen gas in the gaseous mixture so treated was recovered as the purified gas. The cycle time was 30 minutes and off-gas was released at the pressure of 1.4 kg/cm$^2$ (absolute).

Each of four adsorption columns was a column of 0.87 m in diameter and 5.0 m in height. The upper three quarters of each column was packed with active carbon having an average particle size of 2.5 mm and the lower one quarter was packed with silica gel having an average particle size of 1-2 mm. The holding column was 0.7 m in diameter and 11 m in height and had a capacity sufficient to hold 20% of the amount of purge gas used.

EXAMPLE 2

A gas separation system whose flow sheet is shown in FIG. 1 is used and separation of gases was conducted according to the operation illustrated in FIG. 4.

The composition (percentage by dry volume basis) of a gaseous mixture treated was as follows:

$H_2$:78.8, $CH_4$:15.3, $C_2H_6$:4.0, $C_3H_8$:1.4, n-$C_4H_{10}$:0.3, n- and i-$C_5H_{12}$:0.1, $H_2O$:0.1

The gaseous mixture was introduced at the pressure of 29 kg/cm$^2$ (absolute) and the flow rate of 2350 Nm$^3$/hr at 15° C. into the separation system of FIG. 1. As a result of the separation, purified gas consisting of hydrogen of at least 99.96 vol. % purity was obtained at the flow rate of 1598 Nm$^3$/hr. That is, about 86.3% of the hydrogen gas in the gaseous mixture so treated was recovered as the purified gas. The cycle time was 30 minutes and off-gas was released at the pressure of 1.4 kg/cm$^2$ (absolute).

Each of four adsorption columns was a column of 0.7 m in diameter and 5.0 m in height. The upper three quarters of each column was packed with active carbon having an average particle size of 2.5 mm and the lower one quarter was packed with silica gel having an average particle size of 1-2 mm. The holding column was 1.0 m in diameter and 22 m in height and had a capacity sufficient to hold 83% of the amount of purge gas used.

EXAMPLE 3

Figure 5:
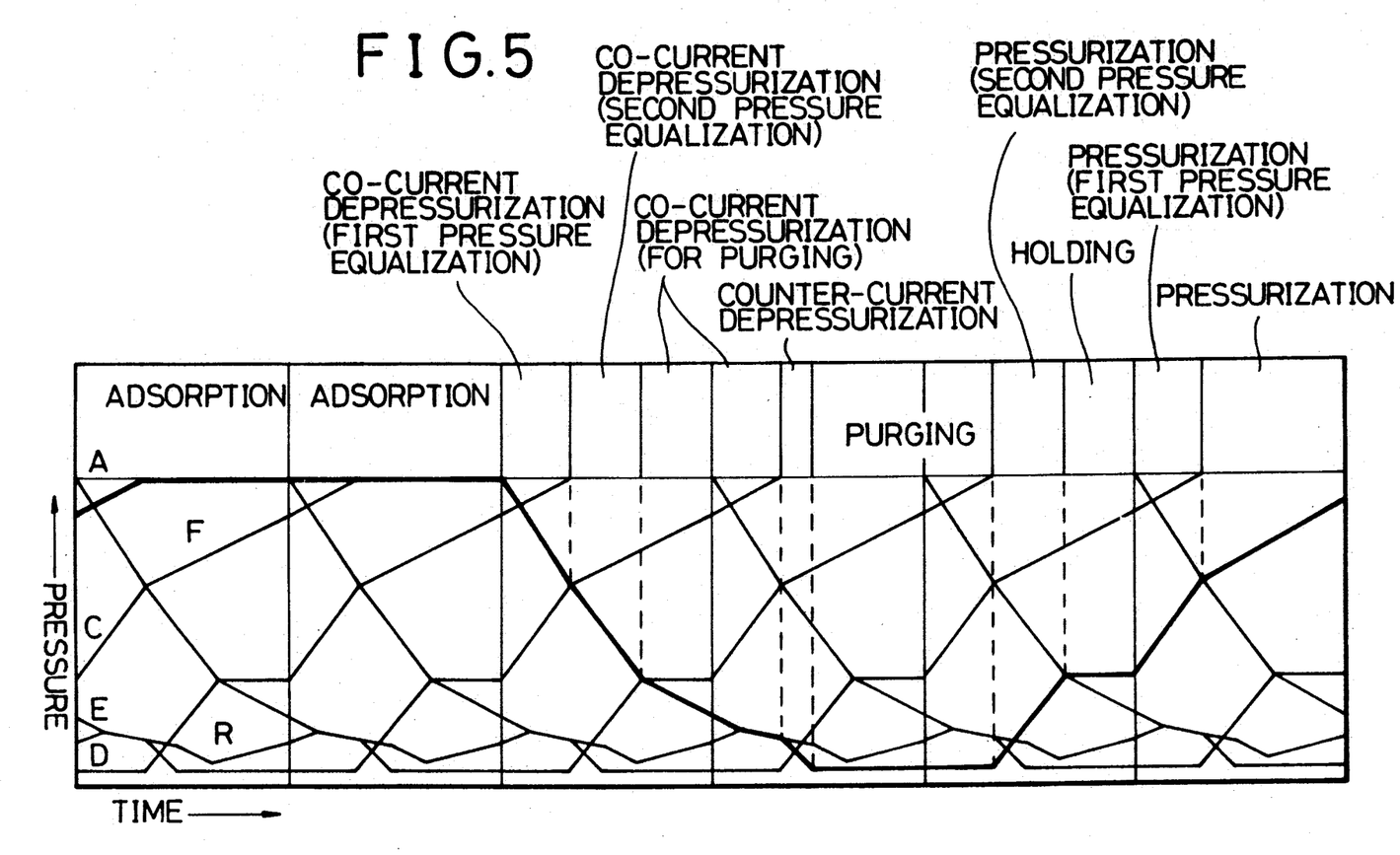
FIG. 5 is one example of a time-pressure diagram during a single cycle when a system includes 6 adsorption columns.

Using a gas separation system of the flow sheet shown in FIG. 1 except for the inclusion of 6 adsorption columns, separation of gases was conducted according to the operation depicted in FIG. 5. Comparing FIG. 5 to FIG. 4 in which four columns were used, it will be seen that two columns were simultaneously employed to conduct adsorption in the adsorption step. Further, the pressure equalization with another adsorption column was increased from once to twice.

The composition (percentage by dry volume basis) of a gaseous mixture treated was as follows:

$H_2$:79.2, $CH_4$:14.9, $C_2H_6$:4.0, $C_3H_8$:1.4, n-$C_4H_{10}$:0.3, n- and i-$C_5H_{12}$:0.1, $H_2O$:0.1

The gaseous mixture was introduced at the pressure of 29 kg/cm$^2$ (absolute) and the flow rate of 5850 Nm$^3$/hr at 15° C. into the separation system. As a result of the separation, purified gas consisting of hydrogen of at least 99.97 vol. % purity was obtained at the flow rate of 4073 Nm$^3$/hr. That is, about 87.9% of the hydrogen gas in the gaseous mixture so treated was recovered as the purified gas. The cycle time was 15 minutes and off-gas was released at the pressure of 1.4 kg/cm$^2$ (absolute).

Each of six adsorption columns was a column of 1.0 m in diameter and 5.0 m in height. The upper three quarters of each column was packed with active carbon having an average particle size of 2.5 mm and the lower one quarter was packed with silica gel having an average particle size of 1-2 mm. The holding column was 0.7 m in diameter and 7 m in height and had a capacity sufficient to hold 23% of the amount of purge gas used.

EXAMPLE 4

Using a gas separation system of the flow sheet shown in FIG. 1 except for the inclusion of 6 adsorption columns, separation of gases was conducted according to the operation depicted in FIG. 5. Comparing FIG. 5 to FIG. 4 in which four columns were used, it will be seen that two columns were simultaneously employed to conduct adsorption in the adsorption step. Further, the pressure equalization with another adsorption column was increased from once to twice.

The composition (percentage by dry volume basis) of a gaseous mixture treated was as follows:

$H_2$:78.9, $CH_4$:15.0, $C_2H_6$:4.0, $C_3H_8$:1.6, n-$C_4H_{10}$:0.3, n- and i-$C_5H_{12}$:0.1, $H_2O$:0.1

The gaseous mixture was introduced at the pressure of 29 kg/cm$^2$ (absolute) and the flow rate of 5850 Nm$^3$/hr at 15° C. into the separation system; and purified gas consisting of hydrogen of at least 99.97 vol. % purity was obtained at the flow rate of 4076 Nm$^3$/hr. That is, about 88.3% of the hydrogen gas in the gaseous mixture so treated was recovered as the purified gas. The cycle time was 15 minutes and off-gas was released at the pressure of 1.3 kg/cm$^2$ (absolute).

Each of six adsorption columns was a column of 1.0 m in diameter and 5.0 m in height. The upper three quarters of each column was packed with active carbon having an average particle size of 2.5 mm and the lower one quarter was packed with silica gel having an average particle size of 1-2 mm. The holding column was 1.0 m in diameter and 15 m in height and had a capacity sufficient to hold 87% of the amount of purge gas used.

What is claimed is:

1. A process for separating gaseous impurities from a gaseous mixture by using at least three adsorption columns containing adsorbents and a holding column of the feed-in/feed-out sequence retaining type having a capacity insufficient to hold a purged gas in its entirety, said process including repeating alternate, cyclic adsorption and desorption steps with said at least three adsorption columns and comprising the following steps:

a) feeding the gaseous mixture into a first adsorption column through an inlet thereof, discharging the purified gas through an outlet of the first adsorption column, and terminating the feeding and discharging before the adsorbent in the first adsorption column becomes spent and the purity of the purified gas falls below a target level;

b) communicating an outlet of another adsorption column, whose adsorbent has been regenerated, with the outlet of the first adsorption column already subjected to step a, so that both adsorption columns equalize in pressure, and then eliminating the communication;

c) communicating the outlet of the first adsorption column, which has been subjected to step b, with a first end of the holding column, which contains a gas received as a result of communication of a second end of the holding column with at least one outlet of other adsorption columns having been subjected to steps a and b, so that the gas inside the first adsorption column is allowed to enter the holding column and, during the entrance of the gas from the first adsorption column into the holding column, maintaining the second end of the holding column in communication with an outlet of a second adsorption column already subjected to steps a, b and c and also to the below-described step d, so that the second adsorption column is purged with gas forced out of the holding column by the gas flow into the holding column and, until the breakthrough of at least one gaseous impurity adsorbed on the adsorbent bed of the first adsorption column begins to occur in the gas flow from the first adsorption column, the gas in the first adsorption column being allowed to enter the second adsorption column through the outlet thereof, either by way of the holding column or directly, to purge the second adsorption column;

d) closing a purge valve of the second adsorption column so that the second adsorption column and the first adsorption column communicate with each other and equalize in pressure, and then eliminating the communication;

e) closing the outlet of the first adsorption column already subjected to step c or d and depressurizing the first adsorption column to a lowest pressure by a purge valve provided on the side of the inlet of the first adsorption column so that the at least one gaseous impurity adsorbed on the adsorbent bed of the first adsorption column is desorbed and eliminated;

f) communicating an outlet of a third adsorption column, which has been subjected to steps a and b, with the first end of the holding column so that the gas inside the third adsorption column is allowed to enter the holding column until the breakthrough of at least one gaseous impurity adsorbed on the adsorbent bed of the third adsorption column begins to occur in the gas flow from the third adsorption column, said gas entering the holding column optionally containing a portion of the purified gas and, during the entrance of the gas from the first adsorption column into the holding column, maintaining the second end of the holding column in communication with the outlet of the first adsorption column already subjected to step e, whereby the first adsorption column is purged with gas forced out of the holding column by the gas flow into the holding column, the gas flow into the holding column optionally containing a portion of the purified gas and, until the breakthrough of the at least one gaseous impurity adsorbed on the adsorbent bed of the third adsorption column begins to occur in the gas, the gas in the third adsorption column being allowed to enter the first adsorption column by way of the holding column or directly, to purge the first adsorption column;

g) closing the purge valve of the first adsorption column, so that the first adsorption column and the third adsorption column communicate with each other and equalize in pressure, and then eliminating the communication;

h) communicating the outlet of at least one other adsorption column, which has been subjected to step a or steps a and b, with the outlet of the first adsorption column, which has been subjected to step f or g, while closing both an inlet of said at least one other adsorption column and the inlet of the first adsorption column, so that the gas inside said at least one other adsorption column is allowed to enter the first adsorption column, said gas entering the first adsorption column optionally containing a portion of the purified gas, to subject said at least one other adsorption column and the first adsorption column to at least one pressure equalizing operation, and then eliminating the communication; and i) causing a gas of the same quality as the purified gas to flow into the first adsorption column, which has been subjected to step h, through the outlet thereof, while closing the inlet thereof, so that the pressure of the first adsorption column equalizes with that of the gas of the same quality as the purified gas, and then closing the outlet of the first adsorption column.

2. The process of claim 1, wherein the capacity of the holding column is sufficient to hold 10–80% of the purge gas.

3. The process of claim 1, wherein in steps c) and f), the highest concentration of the at least one gaseous impurity in the purge gas allowed to flow continuously into the holding column, beyond the capability of the holding column, is not higher than the concentration of the at least one gaseous impurity in the purge gas held in and forced out from the holding column in the same steps.

4. The process of claim 1, wherein the gaseous mixture is a mixture of hydrogen gas and the at least one gaseous impurity to be eliminated, and the at least one gaseous impurity is at least one gas selected from the group consisting of methane, gaseous hydrocarbons other than methane, carbon dioxide and carbon monoxide.

* * * * *